United States Patent [19]

Reynolds et al.

[11] Patent Number: 4,828,712

[45] Date of Patent: May 9, 1989

[54] EXTRACTION OF POLLUTANTS BY INORGANIC CHELATION

[75] Inventors: Stan L. Reynolds, Del Mar; James E. Picker, Carlsbad, both of Calif.

[73] Assignee: Maxwell Laboratories, Inc., San Diego, Calif.

[21] Appl. No.: 138,331

[22] Filed: Dec. 28, 1987

[51] Int. Cl.⁴ .................... B01D 15/02; B01D 15/04
[52] U.S. Cl. .................................. 210/688; 210/691; 210/751; 210/765
[58] Field of Search .................. 210/660, 665–668, 210/672–678, 681, 684, 685, 687, 688, 691, 739, 749, 750, 751, 752, 757, 758, 765, 766, 638; 209/166; 423/24, 63, 53, 70, 100, 139, 157

[56] References Cited

U.S. PATENT DOCUMENTS

| | | | |
|---|---|---|---|
| 3,984,520 | 10/1976 | Cardwell et al. | 423/24 |
| 4,012,483 | 3/1977 | Kane et al. | 423/24 |
| 4,051,230 | 9/1977 | Miyauchi | 210/648 |
| 4,178,235 | 12/1979 | Wilson | 209/166 |
| 4,500,495 | 2/1985 | Hubred et al. | 423/53 |

FOREIGN PATENT DOCUMENTS 0059623 9/1982 European Pat. Off. .

OTHER PUBLICATIONS

D. J. Turner, "The Feasibility of a New Method for Maintaining Clean Conditions in Once-Through Boilers," *J. Appl. Biotechnol.*, 22, 983–992 (1972).
David J. Turner, "Chelate Formation in High Temperature Steam," *J. Appl. Chem. Biotechnol.*, 22, 689–695 (1972).
Motojima et al., "Removal of Radiocobalt in Waste Water by Activated Charcoal Using Oxine as a Chelating Agent," *Annals of Nuclear Energy*, vol. 5, pp. 5–12, Pergamon Press (1978).

*Primary Examiner*—Frank Sever
*Attorney, Agent, or Firm*—Fitch, Even, Tabin & Flannery

[57] ABSTRACT

In a method for removing an inorganic pollutant from contaminated waters, the pollutant is extracted by contact with a chelating agent to form a metal chelate complex. The metal chelate complex is then contacted with a regenerating agent which regenerates the chelating agent for reuse and prepares the inorganic pollutant for removal.

12 Claims, 1 Drawing Sheet

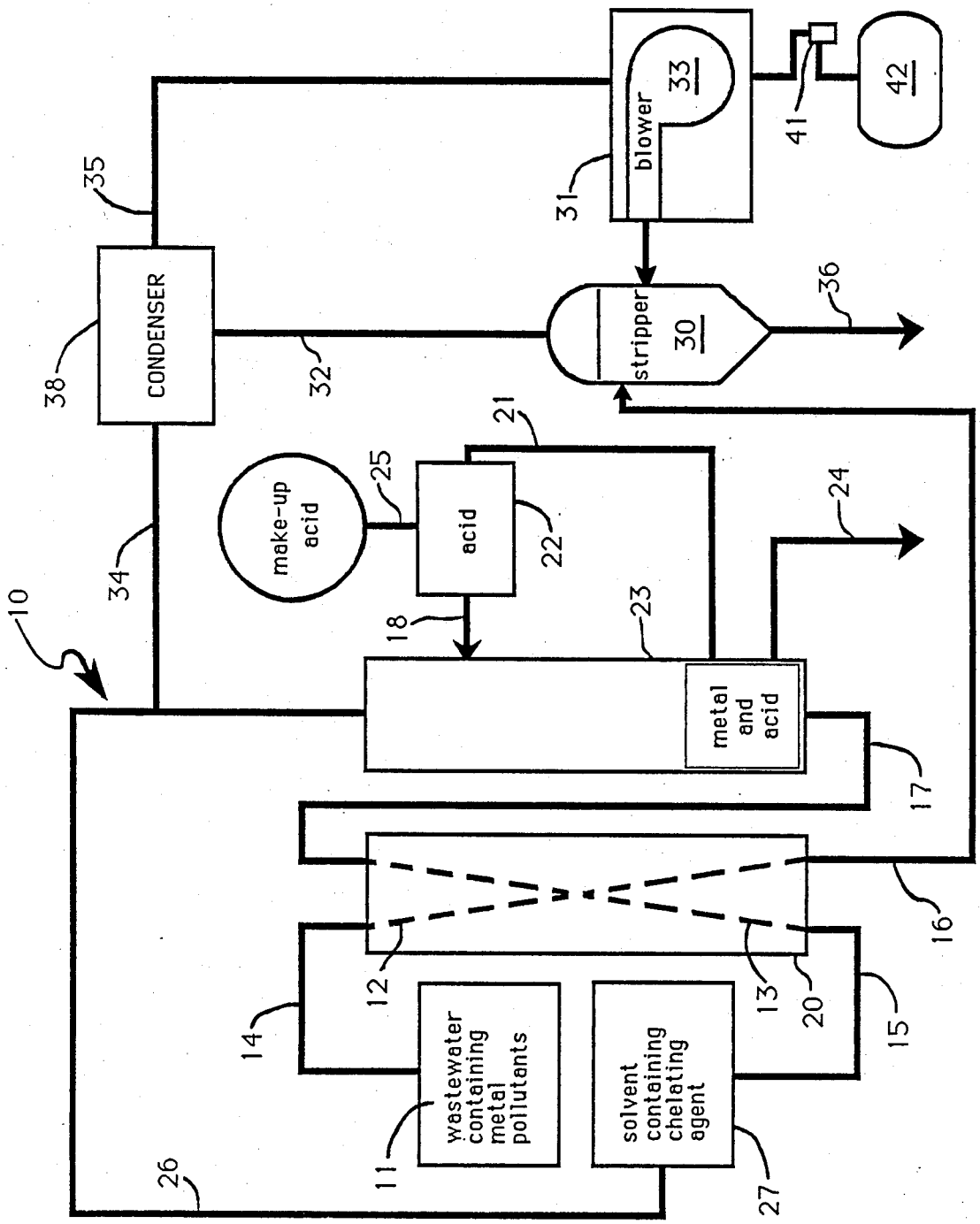

EXTRACTION OF POLLUTANTS BY INORGANIC CHELATION

The present invention relates to methods to remove inorganic pollutants from contaminated environmental water streams and more particularly to remove such pollutants utilizing the principle of chelation chemistry.

BACKGROUND OF THE INVENTION

Water streams are easily contaminated with inorganic pollutants. Two common methods of contamination are industrial process manufacturing operations and seepage or breakthrough from disposal operations to ground water. Not so easy is the decontamination of these now polluted water streams.

Many procedures have been developed for extraction of inorganic pollutants. Some common procedures include ion exchange, electrodialysis, reverse osmosis, precipitation and electrolysis. However, present extraction procedures do not sufficiently satisfy all the problems associated with extraction of inorganic pollutants. The greatest problem is cost; the most common limitation of present extraction procedures is the expense incurred in achieving adequate decontamination.

A second problem is the extraction of numerous pollutants from one waste stream. Many present procedures are effective on simple waste streams but do not yield adequate results on more complicated water systems.

A third problem is the amount of water to be extracted. Many present procedures are designed to handle only limited volumes due to expense and selectivity.

Accordingly, it is a primary object of the present invention to provide inorganic pollutant decontamination processes which are inexpensive, effective on complicated water systems and adaptable to treat large volumes of contaminated water.

SUMMARY OF THE INVENTION

In a method of purifying waste water containing metal pollutants, a stream of waste water is mixed with a counter-current stream of a chelating agent solubilized in a non-polar solvent. During the course of the mixing process, waste water metal contaminants are extracted into the solvent layer via the formation of chelation complexes. The treated water (now free of metal contaminants) is separated at the base of the mixing column, while the solvent phase containing the newly formed metal complex is introduced into a second counter-current mixing column. In this mixing column, an aqueous acid or other suitable regenerating agent is introduced at the top and flows counter-currently against the solvent laden metal complex which is introduced at the bottom. Contact between the acid and the solvated metal complex "reverses" the chelation process, whereupon the metal contaminants form salts which precipitate, and the regenerated chelating agent plus solvent is recycled into a starting material holding tank.

BRIEF DESCRIPTION OF THE DRAWING

The FIGURE is a schematic drawing of apparatus embodying various features of the invention.

DETAILED DESCRIPTION

A closed loop apparatus, indicated generally at 10, utilizes the principle of chelation chemistry for the extraction of inorganic pollutants from a contaminated source 11, such as an environmental water stream. Such a contaminated stream might include, for example, waste water resulting from industrial process manufacturing operations or polluted ground waters resulting from seepage or breakthrough from disposal operations.

A stream 12 of contaminated water containing metal pollutants is fed through a water inlet line 14 to the upper region of an extractor 20 wherein it contacts a counter-current stream 13 of non-polar solvent containing a chelating agent which extracts the metals from the water.

The term "chelating agent" is used to describe a compound which will readily react with metals to form organometallic coordination compounds with the following general structure:

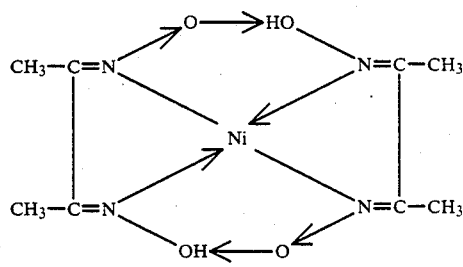

The arrows represent coordinate links, or semipolar bonds formed by the donation of pairs of electrons from the nitrogen atoms to the nickel atom. The chelating agent used in the above example is dimethylglyoxime. The resulting metal complex is typical of all chelates, in that a ring is formed which is closed by one or two coordinate links.

For many polluted water streams, a single stage counter-current extractor 20 suffices to effectively remove the polluting metals. However, a rotary disc counter-current mixing column may be employed to provide maximum extraction efficiencies. The method of contact within column 20 is one taking advantage of gravity flow, utilizing the difference in densities between the solvent and aqueous phases. Pumps or other conventional methods may also be used to assist in establishing desired flow rates and proper contact times to assure extraction. The solvent chosen to carry the chelating agent should be substantially immiscible with water and should have a density at least about 10% less than water, and preferably at least about 25% less.

The treated water 16, now free of metal contaminants, exits from the base of the extractor 20 and is generally ready for reuse or for discharge.

The solvent stream containing the newly formed metal chelate complex exits from the top of the extractor 20 and is carried through a metal chelate complex line 17 to a counter-current mixing column 23 where the solvent/metal chelate complex is contacted with a regenerating agent, such as an aqueous stream of acid, to "reverse" the chelation process. This counter-current mixing column 23 may be a glass-bead filled counter-current mixing column or its equivalent.

The aqueous stream of acid is introduced to the mixing column 23 through an acid inlet line 18 located near the upper end of the column. This heavier acid stream flows downward counter-currently against the immiscible solvent stream which carries the metal complex and which is introduced at the bottom. Contact occurs between the aqueous acid and the metal complex throughout the column which reverses the chelation reaction and causes the metal to form a compound which is highly insoluble in the organic phase, and preferably also in the aqueous phase, thus precipitating the inorganic pollutant and simultaneously regenerating the chelating agent. By highly insoluble is meant having a solubility of about 0.2 g or less per 100 ml. at 20° C. The precipitated metal compound is removed at the base of the column 23 through a removal line 24. The acid is removed through a lower acid removal line 21 and recycled into an acid holding tank 22. Depletion of the acid through use and incidental losses during precipitate removal is compensated by a continuous slip-stream 25 of makeup acid. The regenerated chelating agent exiting the top of the column 23 is now ready for reuse and is returned with the solvent carrier to a solvent holding tank 27 via a regenerated agent line 26.

Although the solvent employed should be substantially water-immiscible to provide a two-phase extraction system, the treated water 16 will invariably contain small amounts of dissolved solvent depending upon its solubility. Economic, environmental or other concerns may make it desirable to remove even such minute amounts of solvent and recover them. If so the treated water 16 is fed to the treated water stripper 30 wherein a stream of higher pressure gas is introduced at a lower region to sparge the water. The gas, for example nitrogen, is supplied by a compressor or by a blower 33 which is controlled to adjust the flow rate of gas according to the liquid inflow to the stripper 30. The blower is encased in a sealed vessel 31, which can support a slight positive pressure. All inputs and outputs to the vessel are gasketed and sealed.

The upwardly flowing bubbles of the sparging or carrier gas vaporize, leach and entrain the volatile solvent so that the vapor is carried out the upper end of the stripper 30 through an upper vapor line 32, while the water is removed through a lower stripped water line 36 for reuse in an industrial process or discharge. The vapor line 32 leads to a condenser 38 where the vaporized solvent is condensed from the carrier gas. The condenser contains an efficient heat transfer cooling system, such as a brazed aluminum plate-and-fin variety, where the temperature is lowered to cause the solvent partial pressure to drop as a result of condensation. The condensed solvent is recycled through a solvent return line 34 leading to the regenerated agent line 26.

The carrier gas exits the condenser 38 through an outlet line 35 and, if a closed system is used, it is returned to the blower 33 where it is recycled to the stripper 30. If air is used as the sparging gas, it may be possible to simply discharge it to the atmosphere. Because there is a slow but continual loss of carrier gas from such a closed system, a valve 41 in the line from a gas storage tank 42 allows make-up flow from the storage tank 42 to continuously replace the gas lost from the system to maintain the desired pressure level.

The chelating agent is selected for its ability to easily and rapidly form complexes with a wide variety of metals which complexes are soluble in volatile organic solvents. Also the chelating agent should be easily regenerated from the metal complex through simple methods of pH control. Preferred chelating agents are 1,2-dioximes and dithizones, and especially preferred are 8-hydroxyquinoline and diphenythiocarbazone. In those instances where one of the preferred chelating agents is not particularly suitable, a selective chelating agent may be used; for example, an agent such as tricaprilil might be employed for the extraction of arsenic.

Table 1 lists a wide variety of metal complexes which 8-hydroxyquinoline is capable of forming with the cited metal ions representing the most probable form in aqueous state. Table 2 lists pH ranges at which the metal diphenythiocarbazone complexes are maintained thus illustrating that simple pH control methods can be used to regenerate the chelating agent.

TABLE 1

| Chelation of Metals Using 8-Hydroxyquinoline | |
| --- | --- |
| Metal Ion | Formula of Complex |
| $Al^{+3}$ | $AlQ_3$ |
| $Bi^{+3}$ | $BiQ_3$ |
| $Cd^{+2}$ | $CdQ_2\ 2H_2O$ |
|  | $CdQ_2$ |
| $Co^{+2}$ | $CoQ_2\ 2H_2O$ |
|  | $CoQ_2$ |
| $Cu^{+2}$ | $CuQ_2$ |
| $Fe^{+2}$ | $FeQ_2$ |
| $Pb^{+2}$ | $PbQ_2$ |
| $Mg^{+2}$ | $MgQ_2\ 2H_2O$ |
| $Mn^{+2}$ | $M_nQ_2\ 2H_2O$ |
|  | $M_nQ_2$ |
| $Mo^{+2}$ | $MoQ_2Q_2$ |
| $Ni^{+2}$ | $NiQ_2\ 2H_2O$ |
|  | $NiQ_2$ |
| $Th^{+4}$ | $ThQ_4$ |
| $U^{+2}$ | $UQ_2\ 2H_2O$ |
| $Zn^{+2}$ | $ZnQ_2\ 2H_2O$ |

Note: The symbol "Q" means the 8-hydroxyquinoline radical.

TABLE 2

| Chelation of Metals Using Diphenythiocarbazone | |
| --- | --- |
| Metal Ion | pH Range |
| $Ag^+$ | 1–10 |
| $Hg^{+2}$ | 1–5 |
| $Pb^{+2}$ | 0–6 |
| $Cu^{+2}$ | 1–6 |
| $Bi^{+3}$ | 1.5–10 |
| $In^{+3}$ | 4–7 |
| $Sn^{+2}$ | 4–9 |
| $Zn^{+2}$ | 5–10 |
| $Cd^{+2}$ | 5–14 |
| $Co^{+2}$ | 5–10 |
| $Ni^{+2}$ | 5–10 |
| $Ti^+$ | 10–14 |

The above-described chelating agents constitute a minor sample of available metal complexing agents. A wide variety of other candidates exist in addition to the 1,2-dioxime and dithizone classes of compounds. As a consequence, it is likely that a viable chelating system can be identified to meet the extraction requirements of any specific pollutant water stream.

Solubility of metal chelate complexes in non-polar volatile organic solvent is an essential requirement for the process. Metal chelates formed using 8-hydroxyquinoline and diphenythiocarbazone are highly soluble in non-polar volatile organic solvents.

The choice of solvent employed in this invention will vary with the nature of the stream to be decontaminated. The solvent is selected on the basis of its preferential solubility for the metal chelate complex of interest. Carbon tetrachloride is an inflammable, colorless liquid with a boiling point of 76.8° C. and low water solubility (0.08 percent at 20° C.) and is highly preferred.

Carbon tetrachloride, however, is a listed priority pollutant, and the use of a treated water stripper would be required if the treated water were to be discharged. The low $CCl_4$ boiling point will allow the stripping operation to be economically performed using air stripping; it is not necessary to use nitrogen because of the low flammability of this solvent. Hexane and pentane are also preferred solvents; both would usually be recovered by the use of nitrogen stripping.

The ability to regenerate the chelating agent once a complex has been formed is an equally important consideration of the present invention. A generic equation representing the interactions which transpire in the described process may be stated as:

$$M^{+n} + nHL \rightleftharpoons ML_n + nH^+$$

$M^{+n}$ is the metal ion and HL is the chelating agent, with n usually being from 1 to 4. This equation illustrates both the formation of metal chelates and a reversion process brought on by acid addition. For practical purposes, however, removal of the uncomplexed metal as an insoluble salt is usually effected, which, in turn, may strongly influence the type of regenerant used In its simplest form, chelating agent regeneration is desirably a function of pH control, and a suitable proton-generating compound is employed. Preferred pH control reversion agents include mineral acids, such as sulfuric acid, hydrochloric acid and nitric acid, and hydrogen sulfide; however, certain metal specific reversion compounds, such as potassium iodide, may be employed to precipitate mercury or silver. Other suitable acids, including Lewis acids, may also be used. A mixture of two or more such regenerants may also be used. To illustrate the ability of chelating agents to perform the required tasks, certain metal removal efficiency and chelating agent regeneration tests were performed. The metal removal-efficiency tests were performed in a separatory funnel, and the organic liquid used for the removal tests, hexane, contained diphenythiocarbazone (generally referred to as "dithizone") as the chelating agent in varying amounts. The aqueous phase contained the target metal pollutant in soluble form. The metal removal efficiency was determined by atomic absorption analysis of the aqueous phase, and efficiencies expressed as "99.999 ..." mean that no metal was found at the 0.01 ppm sensitivity limit for the method.

Shown in Table 3 are the results from these lead removal efficiency tests.

TABLE 3

| | Lead Removal Using Dithizone as Chelating Agent | | |
|---|---|---|---|
| Sample No. | Concentration of Dithizone in Hexane (mg/L) | Concentration of Lead in 10-mL H₂O (mg) | Lead Removal Efficiency (%) |
| 1 | 1.025 | 0.02 | 99.999 ... |
| 2 | 0.513 | 0.02 | 99.999 ... |
| 3 | 0.341 | 0.02 | 99.999 ... |
| 4 | 0.256 | 0.02 | 99.999 ... |
| 5 | 0.205 | 0.02 | 99.999 ... |
| 6 | 0.171 | 0.02 | 99.999 ... |
| 7 | 0.147 | 0.02 | 99.999 ... |
| 8 | 0.128 | 0.02 | 99.999 ... |
| 9 | 0.114 | 0.02 | 99.999 ... |
| 10 | 0.103 | 0.02 | 99.999 ... |
| 15 | 0.069 | 0.02 | 99.999 ... |
| 20 | 0.051 | 0.02 | 75.0 |

Table 4 shows the results for silver removal efficiency tests. All conditions and methods were the same as for the lead removal tests except that efficiencies of 99.0 percent mean that some spikes were visible at the sensitivity limit of 0.01 ppm.

TABLE 4

| | Silver Removal Using Dithizone as Chelating Agent | | |
|---|---|---|---|
| Sample No. | Concentration of Dithizone in Hexane (mg/L) | Concentration of Silver in 10-mL H₂O (mg) | Silver Removal Efficiency (%) |
| 1 | 1.205 | 0.02 | 99.0 |
| 2 | 0.154 | 0.02 | 99.0 |
| 3 | 0.103 | 0.02 | 99.0 |
| 4 | 0.077 | 0.02 | 99.999 ... |
| 6 | 0.041 | 0.02 | 88.4 |
| 9 | 0.010 | 0.02 | 10.0 |

The above results demonstrate that extraction of inorganic pollutants from a water stream can be successfully effected using the disclosed two phase, organic/aqueous system.

Chelating agent regeneration tests also yielded favorable results; for example, a 3 ml sample of a dithizone/silver complex, containing 0.06 mg silver, in carbon tetrachloride was treated with 2N HCl. Test results indicated that complete regeneration of the chelation agent was effected by mixing with a volume of only 0.01 ml of 2N HCl.

The methods of the present invention are thus capable of efficiently and thoroughly removing inorganic metal pollutants from contaminated waters in an economic manner.

While the invention has been described in terms of certain preferred embodiments, modifications obvious to one skilled in the art may be made without departing from the scope of the present invention. For example, the counter-current columns may be replaced by batch reactors or the treated water stripper may be replaced by a solvent evaporation pool.

Various features of the invention are set forth in the following claims.

What is claimed is:

1. A method for the extraction of inorganic metal pollutants from a contaminated water stream comprising initially contacting a first stream of contaminated water with a counter-current second stream of a water-immiscible, non-polar solvent containing a chelating agent to form solvated metal chelate complexes with a particular pollutant of interest and remove same from said first stream an provide a treated water stream;

then contacting said second stream which now contains said solvated metal chelate complexes with a regenerating agent which regenerates the chelating agent by creating said inorganic metal pollutant salts;

separating said salts from said second stream, returning said second stream which contains said solvent and said regenerated chelating agent for reuse;

sparging gas through said treated water stream to vaporize dissolved solvent therefrom; and condensing solvent vapors from said gas following sparging to recover said condensed solvent.

2. A method according to claim 1 wherein the said salt is separated from the said non-polar solvent by precipitation.

3. A method according to claim 1 wherein the said regenerating agent effects a pH change thereby regenerating the chelating agent and creating the said salt.

4. A method according to claim 3 wherein the regenerating agent is a proton generating compound.

5. A method according to claim 1 wherein said regenerating agent is an aqueous acid.

6. A method according to claim 1 wherein the regenerating agent is an aqueous mineral acid or a mixture of mineral acids.

7. A method according to claim 4 wherein the regenerating agent is sulfuric acid, hydrochloric acid or a mixture thereof.

8. A method according to claim 1 wherein the said regenerating agent is present in an aqueous solution and creates a salt which is highly insoluble in either the aqueous or organic phases.

9. A method according to claim 8 wherein the said aqueous regenerating agent solution is caused to flow in counter-current relationship with the said second stream which contains the solvated metal chelate complexes.

10. A method according to claim 1 wherein the chelating agent is selected from the group consisting of 1,2-dioximes, dithizones and mixtures thereof.

11. A method according to claim 1 wherein the chelating agent is 8-hydroxyquinoline or diphenythiocarbazone.

12. A method according to claim 1 wherein the chelating agent is diphenylthio carbazone.

* * * * *

UNITED STATES PATENT AND TRADEMARK OFFICE
CERTIFICATE OF CORRECTION

PATENT NO. : 4,828,712
DATED : May 9, 1989
INVENTOR(S) : Reynolds, Stan L.

It is certified that error appears in the above-identified patent and that said Letters Patent is hereby corrected as shown below:

Column 2, Line 1:   Delete the period after "contaminated".
Column 5, Line 21:  After "used" insert a period.
Column 6, Line 47:  Change "an" to --and--.

Signed and Sealed this

Ninth Day of January, 1990

*Attest:*

JEFFREY M. SAMUELS

*Attesting Officer*   *Acting Commissioner of Patents and Trademarks*